UNITED STATES PATENT OFFICE.

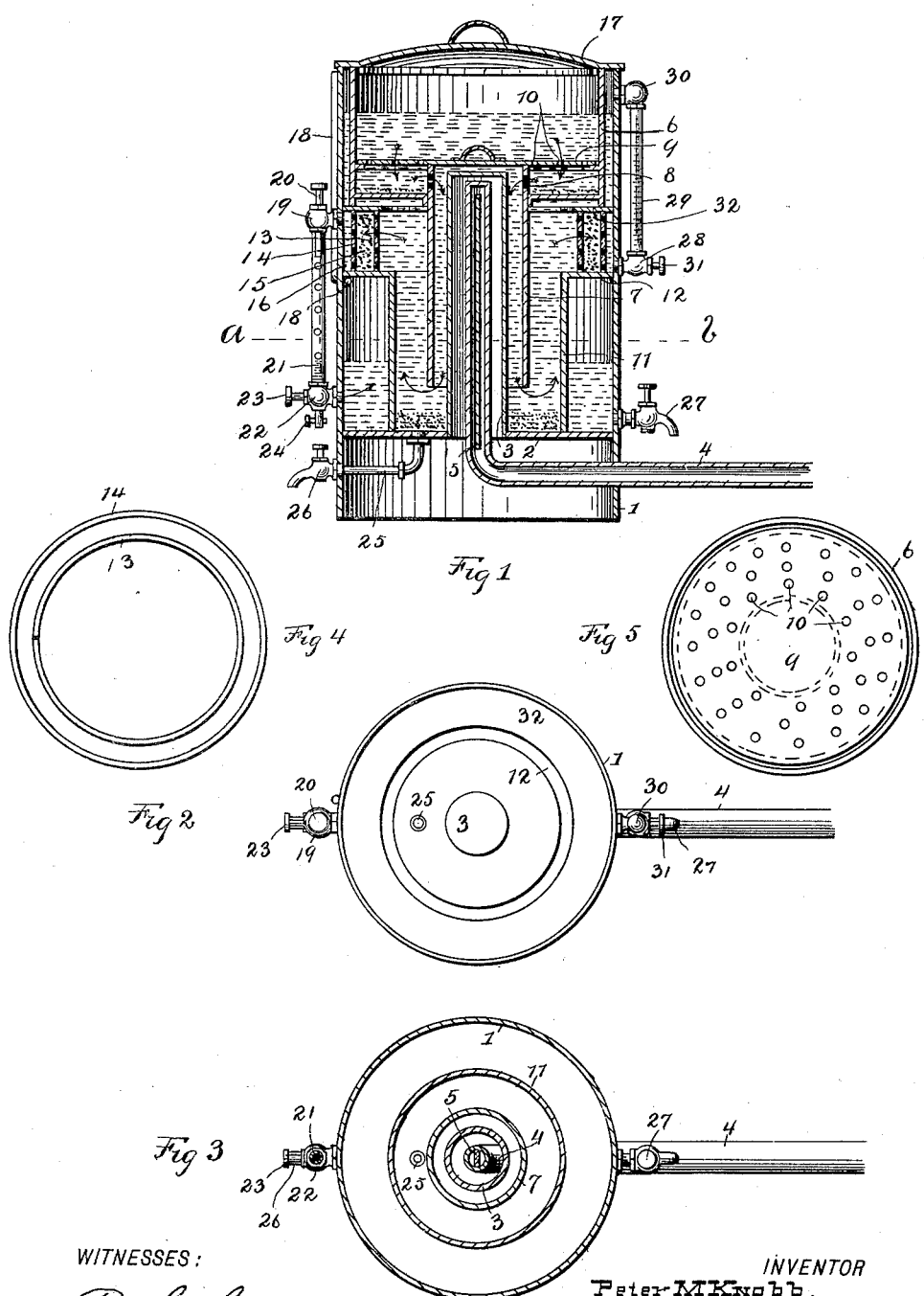

PETER M. KNOPP, OF KANSAS CITY, MISSOURI.

OIL-FILTER.

SPECIFICATION forming part of Letters Patent No. 674,063, dated May 14, 1901.

Application filed September 22, 1900. Serial No. 30,742. (No model.)

*To all whom it may concern:*

Be it known that I, PETER M. KNOPP, a citizen of the United States, residing in Kansas City, in the county of Jackson and State of Missouri, have invented a new and useful Improvement in Oil-Filters, of which the following is a specification, reference being had therein to the accompanying drawings, forming a part thereof.
My invention relates to improvements in oil-filters.

The object of my invention is to provide a filter adapted to remove the impurities from oil, particularly oil that has already been used and has been mixed with impurities arising from such use.

My invention provides a filter so constructed that the impurities having greater specific gravity than the oil will first be removed and following this the removal of those impurities having the same specific gravity.

My invention provides, further, a filter having an outer casing, a chamber within the said casing for receiving the oil containing the impurities, a discharge-opening leading through the outer casing, means by which the oil is carried first downward from the chamber to the inside of the casing below the chamber, and carried then upward at less speed to the discharge-opening, means being provided also for filtering the oil after its upward passage.

My invention provides, further, means by which the oil is heated during its downward passage, thus rendering the more ready separation of the oil from the impurities having greater specific gravity than the oil.

My invention provides still further certain novel features of construction hereinafter fully described and claimed.

In the accompanying drawings, which illustrate my invention, Figure 1 represents a vertical central sectional view showing the filter supplied with oil and in operation. Fig. 2 represents a plan view with the upper chamber removed. Fig. 3 represents a horizontal sectional view taken on the dotted line *a b* of Fig. 1. Fig. 4 represents a plan view of the perforated rings. Fig. 5 represents a plan view of the upper chamber with the transverse screen in position therein.

Similar numerals of reference indicate similar parts.

1 indicates the outer casing, open at the top, preferably cylindrical in form, and provided with a horizontal bottom 2. Secured centrally at its lower end to the bottom 2 is a vertical tube 3, the upper end of which is closed. Disposed within the said tube is the vertical end of a heating-pipe 4, provided with a vertical diaphragm 5. Steam or hot water may be used for the heating material, or the tube may be dispensed with and other means employed for heating the tube 3.

Located in the upper end of the casing is a cylindrical oil-supply chamber 6, open at its top and having a closed bottom provided with a central hole, in which is secured a vertical tube 7, which encircles the tube 3 and extends above the bottom of the chamber 6. Lateral perforations 8 are provided in the tube 7 above the bottom of the upper chamber. Above the tube 7 in the upper chamber 6 is a horizontal plate 9, which extends across the chamber and is provided with perforations 10 in that portion exterior to the tube 7, thus forming a screen for preventing the passage through the filter of coarse impurities, such as straw, &c. Encircling the tubes 3 and 7 is a vertical wall 11, the lower end of which rests upon the bottom of the casing. An annular plate 12 is secured upon the top of the said wall 11 and is secured at its outer periphery to the inside wall of the casing 1. A receiving-chamber for the filtered oil is thus provided. Resting with their lower ends upon the plate 12 are two vertical perforated concentric rings 13 and 14, respectively. The inner ring 13 is split, so as to be removable, and filtering material, such as cotton or other suitable material, is placed between the rings, as indicated by 15. An annular space 16 is provided between the outer ring 14 and the inner wall of the casing 1. The tube 7 extends below the lower ends of the said rings 13 and 14, and the area of cross-section of the annular space between the tube 3 and the tube 7 is less than the area of cross-section of the annular space between the tube 7 and the vertical wall 11 of the receiving-chamber. A flat horizontal plate 32, on which the bottom of the upper chamber 6 rests, covers the annular space 16 and the space between the rings 13 and 14. A cover 17 is fitted over the upper chamber 6. An air-vent pipe 18, connected at its lower end interiorly with the receiving-chamber, extends vertically therefrom to near the top of the casing, on the outside thereof.

Secured in an opening in the casing and connected with the annular space 16 is a valve-fitting 19, provided with a regulating-valve 20. To the lower side of the fitting 19 is secured the upper end of a transparent observing-tube 21, the lower end of which is secured in the upper side of a fitting 22, provided with a shut-off valve 23 and a small valve 24. The fitting 22 is interiorly connected through the casing to which it is secured with the receiving-chamber near the bottom thereof.

Secured to the bottom of the casing is a pipe 25, the inner end of which is vertically disposed and secured to the casing between the tube 3 and the wall 11. The pipe 25 is bent to a horizontal position and has its outer end provided with a valve 26.

Secured to the casing 1, near the bottom thereof, and opposite the receiving-chamber with which it is connected, is a draw-off cock 27.

Secured to the casing 1 at a point opposite the annular space 16 below the fitting 19 is a fitting 28, to the upper side of which is secured the lower end of a transparent tube 29, the upper end of which is secured to a fitting 30, secured to the casing 1. A valve 31 is provided in the fitting 28.

My invention is operated as follows: The oil to be filtered is placed in the upper chamber 6 after the removal of the cover 17. It will flow through the perforations 10 in the screen 9 and into the tube 7 through the perforations 8. These perforations being above the bottom will prevent the carrying into the tube 7 the heaviest impurities and those larger particles that may have passed through the screen 9. The oil will then pass down the tube 7 against the heated tube 3. The oil will pass around the lower end of the tube 7 and pass thence upwardly to the ring 13, through the perforations of which it will pass, thence through the filtering material 15 and the perforations in the outer ring 14 into the annular space 16. The cross-section area of the passage for the oil in the tube 7 being less than the annular space between the tube 7 and the vertical wall 11 of the receiving-chamber, the oil will flow more rapidly downward through the tube 7 than it will pass upwardly on the outside thereof. This rapid movement downward will throw the impurities having greater specific gravity than the oil to the bottom. The heating of the oil in its downward passage is to lessen its specific gravity, so that it will deposit more of the impurities in the lower chamber below the tube 7. Those impurities which still remain in the oil and have the same specific gravity as the oil will be retained in the filtering material 15, the oil passing through as described above into the annular space 16, outside of the ring 14. The filtered oil will then pass through the fitting 19, past the valve 20, through the glass tube 21, past the valve 23, and through the fitting 22 into the receiving-chamber. The rate of feed of the oil may be regulated by the valve 20, and how rapidly it is filtering may be determined by observing the number of drops per minute passing through the tube 21. If it is desired to see what kind of work the filter is doing, the valve 23 may be closed and the small valve 24 opened, so that a portion of the oil may be withdrawn for examination. The filtered oil may be withdrawn in quantities from the cock 27. In the event that it should be desired to filter the oil through water, water is first placed in the lower chamber, enough being employed to submerge the lower end of the tube 7. The observation-tube 29 is used to detect water or any material heavier than the oil. By continued use enough water may accumulate in the lower chamber to pass through the filtering material 15 into the annular space 16. As the lower end of the tube 29 is below the upper end of the tube 21 and the discharge-opening in the casing opposite the said annular space, the water will show in the lower end of the tube 29 before any has passed into the receiving-chamber. Thus being warned, the operator may remove the water and other impurities through the pipe 25 and valve 26. To clean the upper chamber, the perforated screen 9 is first removed and cleaned. Then the chamber 6, together with the attached tube 7, is withdrawn from the casing, when the impurities collecting upon the bottom of the upper chamber may be removed. New filtering material may now be placed between the rings by removing the inner one.

Any other source of heat may be employed for heating the oil than the one described and various other modifications may be made without departing from the spirit of my invention.

Having thus described my invention, what I claim, and desire to secure by Letters Patent, is—

1. The combination with an upper chamber, of a lower chamber, an oil-passage connecting the two chambers, means for heating the oil as it passes through the said passage, a receiving-chamber, a passage connecting the lower chamber and the receiving-chamber, and filtering material disposed across the said passage and at a higher plane than the discharge end of the first passage, substantially as described.

2. The combination with an upper chamber, of a lower chamber, an oil-passage connecting the two chambers, a receiving-chamber, a passage connecting the lower chamber and the receiving-chamber, filtering material disposed across the second passage at a plane higher than the discharge end of the first passage, and means for regulating the passage of oil through the second passage, substantially as described.

3. The combination with an upper chamber, of a lower chamber, an oil-passage connecting the two chambers, means for heating the oil passing through the said passage, a receiving-chamber, a passage connecting the receiving and the lower chambers, filtering material disposed across the second passage at a plane higher than the discharge end of the first passage, and means for regulating the passage of oil through the second passage, substantially as described.

4. The combination with an upper chamber, of a lower chamber, an oil-passage connecting the two chambers, a receiving-chamber, a passage connecting the lower chamber and the receiving-chamber, means for regulating the flow of oil through the said second passage, means by which the flow of oil therethrough may be observed, and filtering material disposed across the second passage at a plane higher than the discharge end of the first passage, substantially as described.

5. The combination with an upper chamber, of a screen extending transversely across the same, a lower chamber, a vertical tube extending through and above the bottom of the upper chamber and having its lower end disposed above the bottom of and discharging into the lower chamber and provided with lateral openings below the said screen and above the bottom of the upper chamber, a receiving-chamber, an oil-passage connecting the receiving and the lower chambers, the lower chamber discharging into the said passage on a plane higher than the discharge end of the vertical tube, substantially as described.

6. The combination with an upper chamber, of a screen extending transversely across the same, a lower chamber, a vertical tube extending through and above the bottom of the upper chamber and having its lower end disposed above the bottom of and discharging into the lower chamber and provided with lateral openings below the said screen and above the bottom of the upper chamber, means for heating the oil passing through the vertical tube, a receiving-chamber, an oil-passage connecting the receiving and the lower chambers and connected with the lower chamber on a plane above the discharge end of the vertical tube, and filtering material disposed across the said oil-passage, substantially as described.

7. The combination with an upper chamber, of a screen extending transversely across the same, a lower chamber, a vertical tube extending through and above the bottom of the upper chamber and having its lower end disposed above the bottom of and discharging into the lower chamber and provided with lateral openings below the said screen and above the bottom of the upper chamber, a receiving-chamber, means for heating the oil passing through the vertical tube, and an oil-passage connecting the receiving and the lower chambers and connected with the lower chamber on a plane above the discharge end of the vertical tube, substantially as described.

8. The combination with an upper chamber, of a lower chamber, a vertical tube extending through the bottom of the upper chamber and extending into and near the bottom of the lower chamber, the transverse area of the lower chamber exterior of the said tube being greater than the transverse area of the oil-passage through the said tube, a receiving-chamber, an oil-passage connected at its lower end with the said receiving-chamber and at its upper end connected to the lower chamber on a plane above the lower end of the vertical tube, substantially as described.

9. The combination with an upper chamber, of a lower chamber, a vertical tube extending through the bottom of the upper chamber and extending into and near the bottom of the lower chamber, the transverse area of the lower chamber exterior of the said tube being greater than the transverse area of the oil-passage through the said tube, a receiving-chamber, an oil-passage connected at its lower end with the said receiving-chamber and connected at its upper end to the lower chamber on a plane above the discharge end of the vertical tube, and means for filtering the oil passing from the lower chamber into the said second passage, substantially as described.

10. The combination with an upper chamber of a discharge-tube connected therewith, a lower chamber encircling the said discharge-tube, a vertical tube closed at its upper end, disposed within the said discharge-tube and secured to the bottom of the lower chamber, a receiving-chamber, an oil-passage connected at its lower end therewith and connected at its upper end to the lower chamber on a plane above the lower end of the discharge-tube, and means for filtering the oil passing from the lower chamber in the said oil-passage, substantially as described.

11. The combination with an upper chamber, of a lower chamber, a tube connected with the upper chamber and discharging into the lower chamber above the bottom thereof, a receiving-chamber, an oil-passage connected at its lower end to the receiving-chamber and connected at its upper end to the lower chamber on a plane above the lower end of the said tube, and a transparent tube connected at its lower end to the lower chamber below the upper end of the oil-passage and above the lower end of the said tube, substantially as described.

12. The combination with an upper chamber, of a lower chamber, a vertical tube discharging from the upper chamber into the lower chamber, a vertical tube rising from the bottom of the lower chamber, having its upper end closed and encircled by the other tube thus forming an annular passage between the two tubes, means for heating the oil passing through the said annular passage, a receiving-chamber, an oil-passage connecting the receiving and the lower chambers, and means for filtering the oil passing from the lower chamber through the said passage into the receiving-chamber, substantially as described.

13. An oil-filter comprising an outer casing having a closed bottom and an open top, a removable oil-receiving chamber disposed therein, a vertical tube extending through the bottom of the said chamber and removable therewith and discharging into the outer casing, an annular receiving-chamber disposed within the casing and closed on all its sides and encircling the vertical tube, a pipe connected at its bottom with the annular receiving-chamber and connected at its top with the interior of the casing at a point above the lower end of the vertical tube, substantially as described.

14. An oil-filter comprising an outer casing having a closed bottom and an open top, a removable oil-receiving chamber disposed within the said casing, a vertical tube extending through the bottom of the said chamber, removable therewith and discharging into the casing, an annular receiving-chamber encircling the said vertical tube, two vertical concentric, perforated rings resting upon the said annular receiving-chamber and encircling the vertical tube, filtering material between the said ring, an annular space between the side walls of the casing and the outer of said rings, and a pipe connected at its lower end to the receiving-chamber, and connected at its upper end to the said annular space, the lower end of the vertical tube being disposed at a lower plane than the lower ends of the two perforated rings, substantially as described.

15. An oil-filter comprising an outer casing having a closed bottom and an open top, a removable oil-receiving chamber disposed within the said casing, a vertical tube extending through the bottom of the said chamber and provided with lateral openings disposed above the bottom of the said chamber, a transverse screen extending across the said chamber above the vertical screen and removable from the said chamber, an annular receiving-chamber encircling the said vertical tube and having its upper end disposed above the lower end of the said tube, two concentric, perforated, vertical rings resting upon the said annular chamber, filtering material between the said rings, an annular space between the side walls of the casing and the outer of said rings, a pipe connected at its bottom to the receiving-chamber and connected at its top with the said annular space, substantially as described.

16. An oil-filter comprising an outer casing having a closed bottom and an open top, a removable oil-receiving chamber disposed within the said casing, a vertical tube secured at its lower end to the bottom of the said casing and having its upper end closed, a tube encircling the said vertical tube and extending through the bottom of the removable chamber and connected interiorly therewith above the bottom thereof, a transverse screen extending across the removable chamber and disposed above the upper end of the tube connected therewith, two vertical perforated concentric rings encircling the two vertical tubes, an annular space between the outer of said rings and the side walls of the casing, two annular plates disposed respectively upon the bottom and top ends of the said rings and closing the bottom and top of the said annular space, the said perforated rings being disposed above the lower end of the tube discharging from the removable chamber, and an oil-discharge opening through the casing opposite the said annular space, substantially as described.

In testimony whereof I have signed my name to this specification in the presence of two subscribing witnesses.

PETER M. KNOPP.

Witnesses:
   WARREN D. HOUSE,
   JESSIE R. COMSTOCK.